United States Patent [19]

Andersen

[11] 3,802,392

[45] Apr. 9, 1974

[54] LIVESTOCK STALL DIVIDER STRUCTURE
[76] Inventor: Benedict R. Andersen, 834 S. California, St., Lodi, Calif. 95240
[22] Filed: May 26, 1972
[21] Appl. No.: 257,140

Related U.S. Application Data

[63] Continuation-in-part of Ser. No. 92,647, Nov. 25, 1970, abandoned.

[52] U.S. Cl. ................................................ 119/27
[51] Int. Cl. ............................................ A01k 29/00
[58] Field of Search ................................. 119/27, 15

[56] References Cited
UNITED STATES PATENTS

| | | | |
|---|---|---|---|
| 3,421,478 | 1/1969 | Warmerdam | 119/27 |
| 1,142,246 | 6/1915 | Gagan | 119/27 |
| 1,996,196 | 4/1935 | Ferris | 119/15 |
| 1,910,666 | 5/1933 | Babson | 119/15 |

Primary Examiner—Hugh R. Chamblee
Attorney, Agent, or Firm—Warren, Rubin, Brucker & Chickering

[57] ABSTRACT

A stall divider structure for livestock, and particularly for dairy cows, is disclosed in which mounting means for the stall dividers are provided which allow the formation of a plurality of high strength stalls. The stalls are cantilevered over the ground for ease of cleaning and construction and are readily detachable and remountable for installation, removal, and release of trapped animals. Two types of divider mounting means for cantilevered connection of the dividers to the remainder of the stall structure are provided. The livestock stall structure is further formed to be completely detachable from supporting posts and is modular in nature to allow the installation of almost any number of stalls.

7 Claims, 11 Drawing Figures

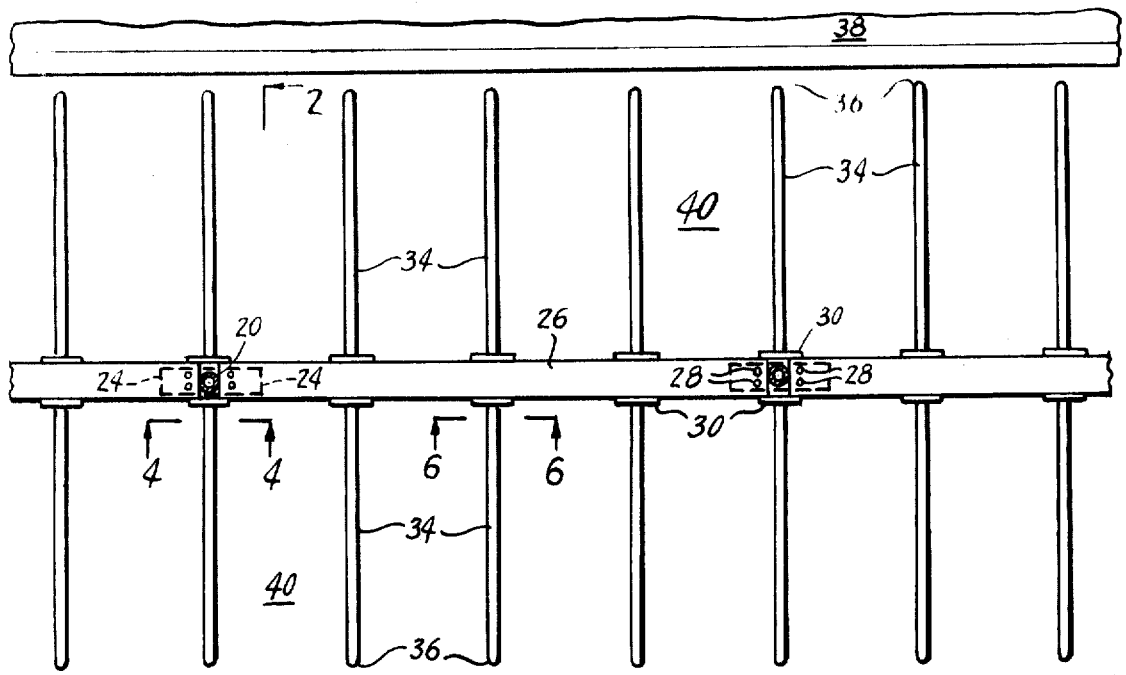
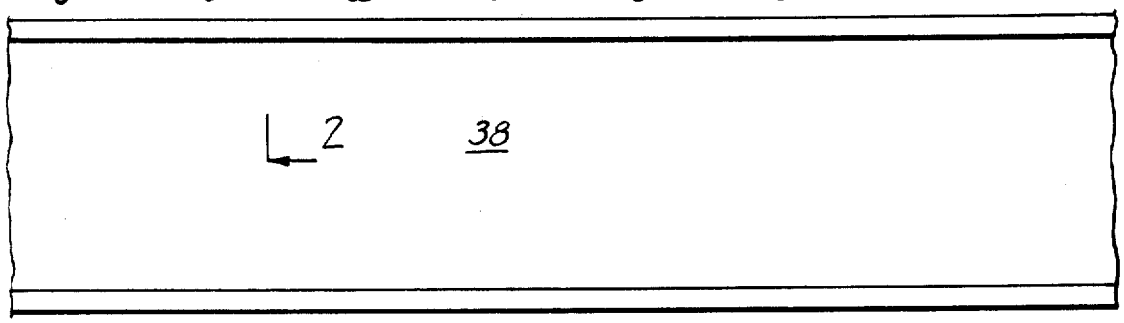
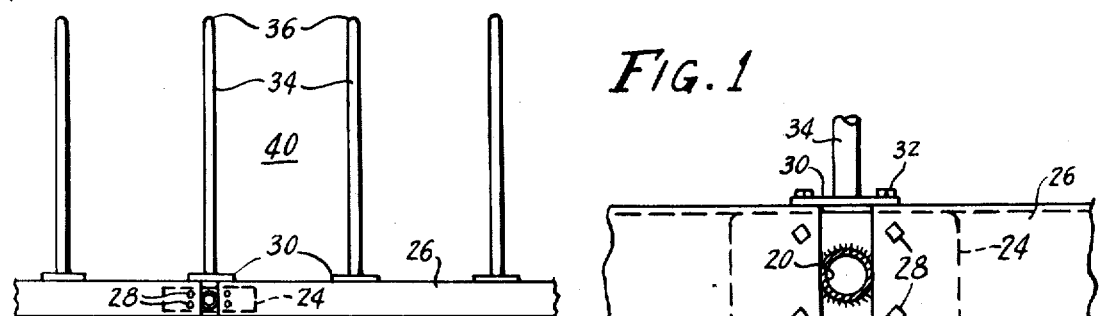
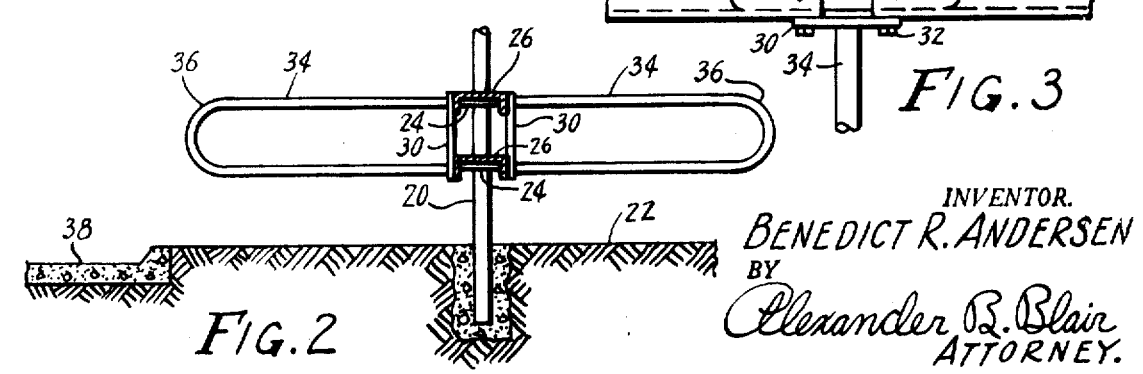
FIG.1
FIG.3
FIG.2
INVENTOR.
BENEDICT R. ANDERSEN
BY
Alexander B. Blair
ATTORNEY.

LIVESTOCK STALL DIVIDER STRUCTURE

BACKGROUND OF THE INVENTION

This is a continuation-in-part application based upon my co-pending application Ser. No. 92,647, filed Nov. 25, 1970 now abandoned.

Numerous different types of stalls and stall dividers have been devised for use in connection with livestock. While these livestock stalls have had various characteristics in common, they have been employed to satisfy a wide diversity of needs. Thus, some structures include feeding mangers while others incorporate apparatus particularly well suited for milking.

The livestock stall divider structure of the present invention is particularly designed for use in the dairy industry to provide resting stalls for dairy cattle. The cows using these stalls typically enter the stalls and then lie down, and accordingly, the floor of the stall is usually dirt. The cow will spend substantial time in the stall and periodically will rise to leave the stall for feeding or milking, both of which are always done in another area. The cow will also stand to pass its excrements, and the stall is preferably provided with a training rail formed to cause the cow to back partially out of the stall for this purpose, as is more fully set forth in my co-pending patent application Ser. No. 106,748 now U.S. Pat. No. 3,726,257.

Accordingly, livestock stalls for use in the dairy cattle industry as resting areas for cattle must be of relatively high strength and durability since the cows spend considerable time in the stalls and are continually getting up and lying down in the stalls, with attendant bumping and leaning on the stall dividers. Moreover, the stalls should be formed so that they do not trap the cows during their repetitive standing and lying down, and if trapped, the animals must be easily released from the stalls. Still further, the stalls must be periodically cleaned of manure and other debris making it highly advantageous to minimize the number of ground supports for the divider structure.

One approach to the provision of a livestock stall is typified by U.S. Pat. Nos. 1,066,194 and 2,547,426 in which side partitions or dividers are provided which are combined with a front closure structure to define the livestock stall. In these stalls, however, the side dividers are provided with posts at the ends thereof which are highly undesirable. First, cleaning livestock stalls of this type is most difficult since one must clean around the post. Secondly, a certain number of animals can and will become trapped underneath the side dividers by the posts. Thus, while the posts provide rigidity which is necessary and desirable for the stalls, they do so at the expense of making the stalls difficult to clean and dangerous to the animals.

Another type of prior stall which has been used for dairy cattle is illustrated in U.S. Pat. No. 2,601,623. This device employs a loop-type divider which is secured to a vertical post and oriented in a horizontal plane. The cow is tied to the post during milking. While the divider is easy to clean under, each divider is secured to its own post, which post must be cleaned around. Moreover, this type of structure is totally unsuited for use as a cow resting stall since the cows would periodically raise up with their heads becoming caught in the horizontal loop.

A vertically oriented loop-type stall divider has also been employed, as can be seen in U.S. Pat. Nos. 2,642,037 and 3,392,709. Again, these structures are not designed as resting areas for cows. In both structures, the stall dividers are mounted on individual posts with no provision being made for removal of the dividers short of tearing the entire structure down. The stalls are designed for use by the animals in a standing position and include expensive foundation work. The structure of U.S. Pat. No. 2,642,037 is particularly hazardous to animals in that the dividers are mounted on posts having their upper ends bent laterally, causing the dividers to present a horizontal area into which the cow may stick its head when standing up.

Finally, U.S. Pat. No. 3,168,888 illustrates a dairy cow feeding stall in which the stall dividers are supported at the ends thereof from the roof structure in an attempt to make a stall which can be easily cleaned and yet is strong and durable. These structures are, however, also designed for use by the animal while it is standing, and no provision is made for removal of the side dividers.

The above-described stall structures further generally have the defect that they must be constructed, as opposed to assembled, in the field or at their place of installation. Thus, they are not well suited for manufacture at a factory and simple assembly in the field.

Accordingly, it is an object of the present invention to provide a livestock stall divider structure which has high strength and yet is easy to assemble, allows easy cleaning of the stalls, and minimizes the danger of injury to the animals.

It is another object of the present invention to provide a livestock stall divider structure which is particularly well suited for use as dairy cow resting stalls and which may be easily incorporated into or removed from a barn or the like.

Another object of the present invention is to provide a livestock stall divider structure which can be manufactured for assembly at the site with relatively simple tools.

Another object of the present invention is to provide a livestock stall divider structure in which the weight of the components is reduced to effect cost savings and ease of handling while maintaining the high strength and durability thereof.

The livestock stall divider structure of the present invention has other objects and features of advantage which will become apparent and are set forth in more detail hereinafter.

SUMMARY OF THE INVENTION

The livestock stall divider structure of the present invention is comprised, briefly, of: at least two posts, connecting means mounted and extending horizontally or longitudinally therebetween at a spaced distance above the ground, and a plurality of dividers mounted to the connecting means and defining between the posts a plurality of stalls. Divider mounting means are formed for and detachably mount the dividers to the connecting means, and the divider mountings further are formed for cantilevered securement of each of the dividers to the connecting means at positions on the connecting means disposed and relatively spaced apart to withstand moments about the mounting means in the vertical plane due to the weight of the dividers and in the horizontal plane due to lateral deflection of the dividers by livestock. The connecting means is preferably detachable from the vertical posts and formed as a pair of vertically spaced channel members which may be utilized to give strength to the dividers against moments in the vertical plane. In one form of the invention bolt-on plates to which the dividers are fixedly secured are provided. In another form of the invention sockets are fixedly secured to the connecting means and the dividers are releasably locked in place in the sockets.

DESCRIPTION OF THE DRAWINGS

FIG. 1 is a top plan view of a livestock stall divider structure constructed in accordance with the present invention.

FIG. 2 is a fragmentary, side-elevational view, partially in cross-section and taken along the plane of line 2—2 of FIG. 1.

FIG. 3 is an enlarged, fragmentary, top plan view of a vertical support post.

DESCRIPTION OF THE PREFERRED EMBODIMENTS

Figure 4:
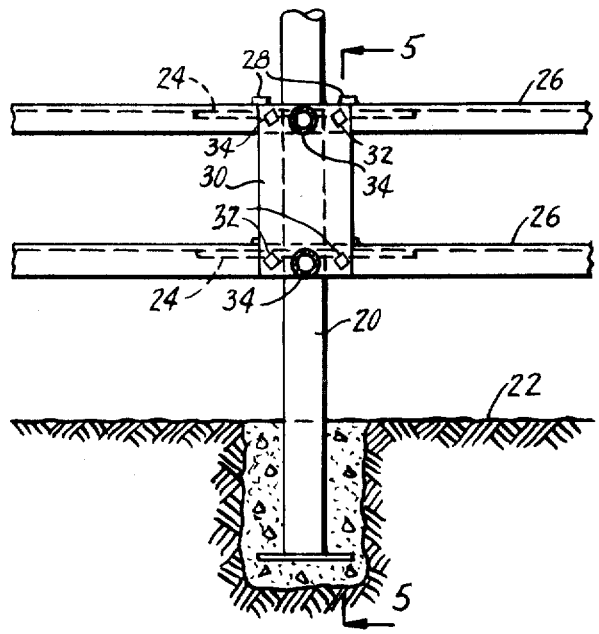
FIG. 4 is a fragmentary, side-elevational view, taken along the plane of line 4—4 in FIG. 1.
Figure 5:
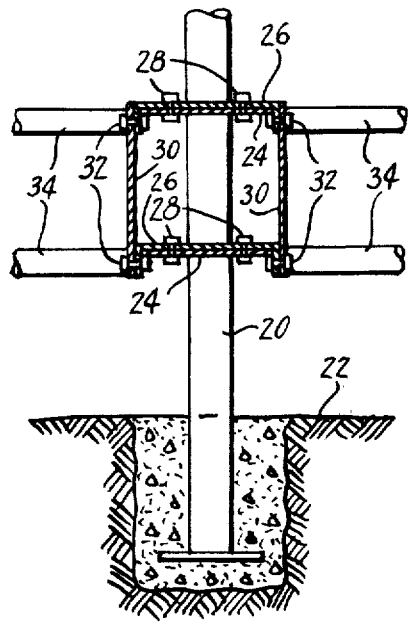
FIG. 5 is an end elevational view, in cross-section, and taken along the plane of line 5—5 in FIG. 4.
Figure 6:
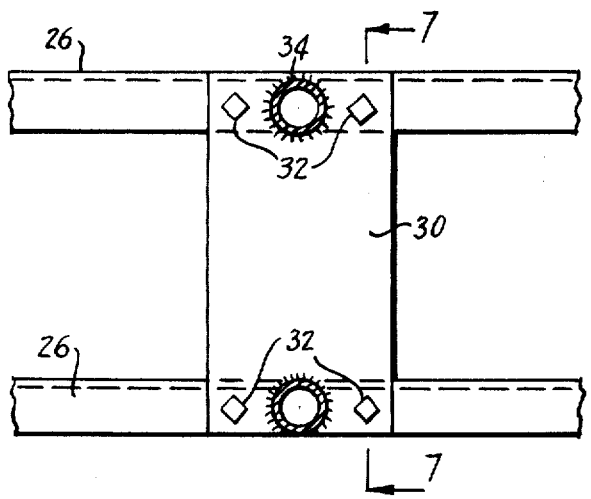
FIG. 6 is an enlarged, fragmentary, side-elevational view, taken along the plane of line 6—6 in FIG. 1.
Figure 7:
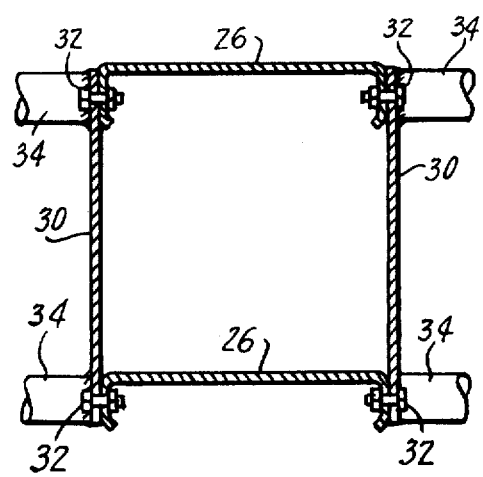
FIG. 7 is an end elevational view, partially in cross-section and taken along the plane of line 7—7 of FIG. 6.
Figure 8:
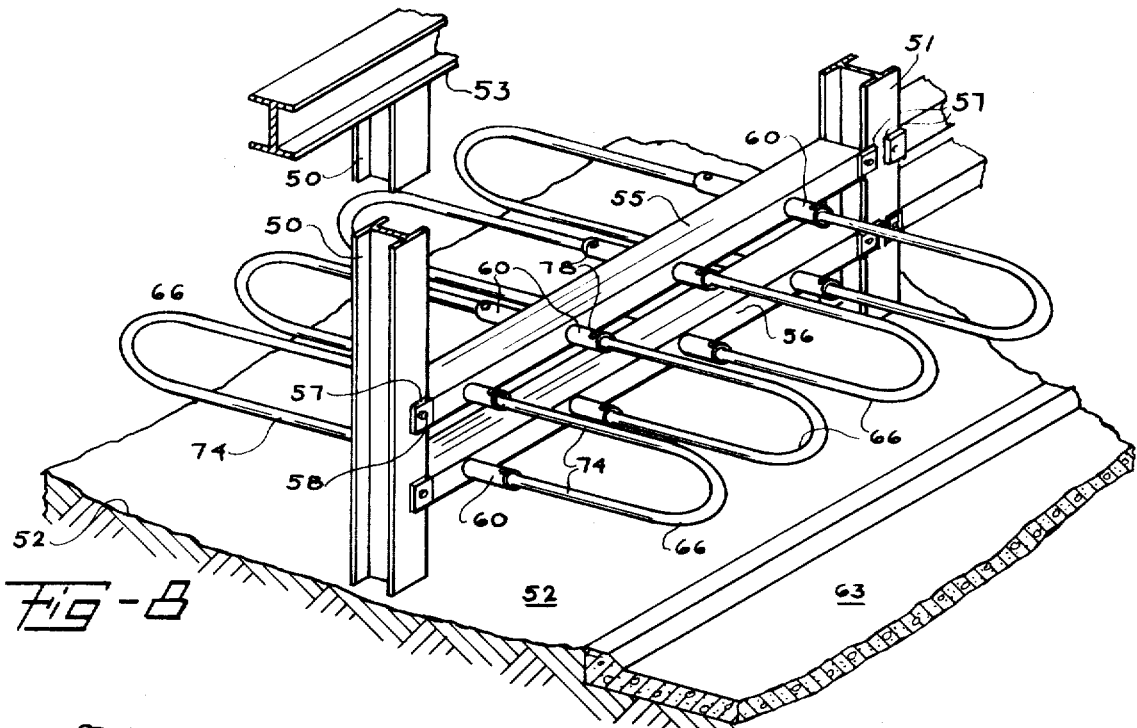
FIG. 8 is a top perspective view of an alternative embodiment of a livestock stall divider structure constructed in accordance with the present invention.
Figure 9:
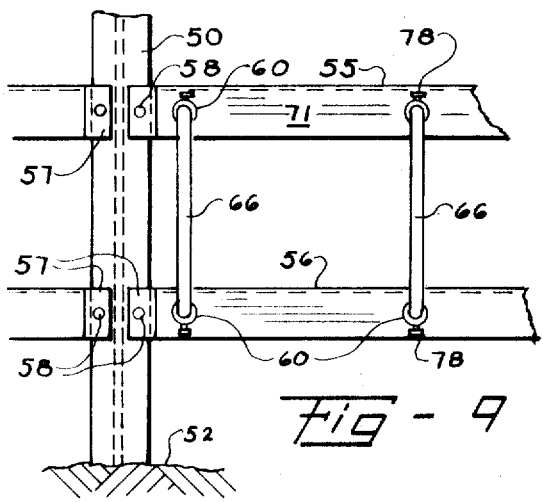
FIG. 9 is an enlarged, fragmentary, side-elevational view of the structure of FIG. 8.

Referring now to FIGS. 1 and 2, the livestock stall structure of the present invention can be seen to include at least two post means, which are here shown as vertical posts 20 having a cylindrical cross-section. These posts are embedded in a concrete footing and preferably used to support a protective roof (not shown). It is an important feature of the present invention that the livestock stall divider structure is readily and easily incorporated into buildings such as barns and the like. As will be seen in FIG. 1, posts 20 are relatively spaced apart to define an area therebetween sufficient for a plurality of livestock stalls. As shown in the drawings, it is preferred that the stalls be disposed over ground 22, which is preferably relatively loose and therefore more comfortable and less likely to cause injury to the cow than concrete. The stall areas are, however, preferably bordered by concrete isles or alleyways 38 to allow ingress and egress of the livestock to and from the stalls. Mounted between posts 20 are two vertically spaced and horizontally extending beams or channel members 26 which span the distance between the posts at a vertically spaced distance above ground 22, as best seen in FIGS. 4 and 5. In order to mount the horizontally extending channels 26 to posts 20, it is preferable that a plate 24, best seen in FIG. 3, be welded or otherwise fixedly secured to post 20 so as to extend inside and support channels 26. The channels are bolted to plates 24 by means of bolts or fasteners 28.

In order to provide a livestock stall divider which is easy to clean under, minimizes danger of injury to the animal, and has strength and durability, it is an important feature of the present invention to mount dividers 36 to connecting means 26 by divider mounting means, such as plates 30 and bolts 32, which detachably mount the dividers to channels 26. The mounting means further cantilever the dividers over the stall area by means of a high strength attachment to the connecting channels between the vertical posts. This is best seen in FIGS. 4 through 7, and the longitudinal legs 34 of the U-shaped dividers 36 are fixedly secured to plates 30, as by welding or the like.

The divider mounting means for the stall divider of the present invention allows dividers 36 to be detachably cantilevered over ground 22 without the need of overhead support structures or posts at the distal ends of the dividers. Additionally, the mounting of dividers to form a plurality of stalls between the posts means that the stalls 40 can be easily cleaned. As shown in FIG. 1, there is only one and a fraction ground posts for each eight stalls. Additionally, dividers 36 can be easily removed in the event that a cow should become trapped under one of the dividers. All that is required is that bolts 32 be removed, which releases mounting plate 34 and the entire divider element. Still further, it is possible to readily detach the connecting channels 26, either before or after removing dividers 36, by unfastening bolts 28. The ability to detach the dividers and the connecting channels is further advantageous in the event that a portion of the stall should become damaged and need replacing. Still further, the almost modular structure of the stalls of the present invention allows them to be incorporated into one building and subsequently removed and reinstalled at a new location.

The flexibility of the livestock stall structure of the present invention has not been achieved at the sacrifice of strength and durability of the divider structure. The mounting means are formed to releasably connect each of the dividers positions disposed and relatively spaced apart sufficient to withstand the moments which are induced in the vertical and horizontal planes by the weight of the dividers and lateral loading by the livestock. As best may be seen in FIG. 7, bolts 32 are positioned on either side of the legs 34 of dividers 36. Thus, the bolts are positioned to withstand a substantial moment in a horizontal plane by reason of the cows bumping into or leaning against the ends of the dividers. A typical cow may weigh between 800 and 1,500 pounds, and during the process of entering the stall, lying down and standing up they will often hit, bump into or lean against the cantilevered stall dividers. Since the dividers are typically about 6 feet and 6 inches long, the forces at mounting plate 30 are quite substantial. The mounting plates, however, extend horizontally away from both sides of the vertical plane in which the divider is oriented and bolts 32 secure the plates at relatively widely spaced horizontal points on both sides of the divider to effect a secure and high strength connection. Additionally, bolts 32 are relatively spaced apart vertically by reason of being connected to vertically spaced channel members 26. This vertical spacing affords a high strength connection which resists moments in the vertical plane, such as are induced by the weight of the divider elements themselves.

An alternate form of the high strength livestock stall divider structure of the present invention is shown in FIGS. 8–11. A pair of relatively spaced apart vertical posts 50 and 51, here shown as I-beams, may be positioned to define an area therebetween in which a plurality of stalls may be formed. Beams 50 and 51 are buried into the ground 52 or bolted to concrete and preferably may be used to support a roof element 53, such as an I-beam on which roofing material (not shown) may be supported. The posts are preferably disposed adjacent a concrete isle or alleyway 63. Spanning the distance between posts 50 and 51 are a pair of channels 55 and 56 formed substantialy in the same manner as channels 26. In order to allow channel members 55 and 56 to be removed from posts 50 and 51, the channels are preferably provided with bifurcated end brackets 57 which are secured to posts 50 and 51 by means of a fastener 58, such as a bolt or bolts. One bolt 58 may be passed through both sides of the bifurcated ends 57 and both flanges of the I-beam, or a pair of fasteners 58 may be used with each passing through only one flange of the I-beam.

In order to effect a substantial weight savings in the materials required, and accordingly a cost savings and additionally to effect an increase in the overall strength of the stall divider structure of the present invention, a plurality of divider receiving sockets 60 are secured in horizontally spaced relation along the length of channels 55 and 56. Sockets 60 are oriented transverse to the longitudinal axis of the connecting channels 55 and 56 and extend outwardly from both sides thereof. Sockets 60 are formed to have a substantial depth dimension for receipt of U-shaped dividers 66.

Figure 10:
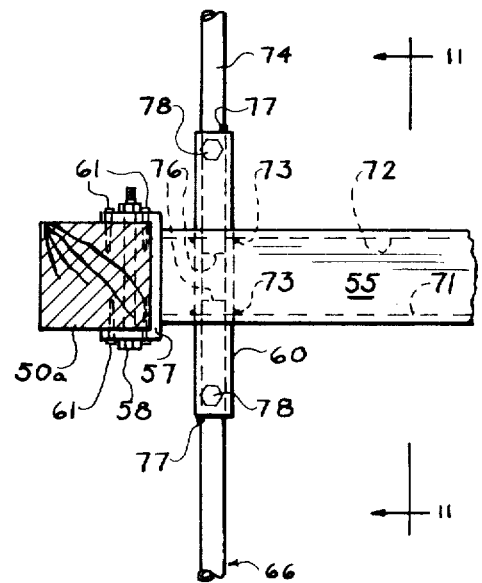
FIG. 10 is an enlarged, top plan view, partially in cross-section, showing the structure mounted on a wooden post.
Figure 11:
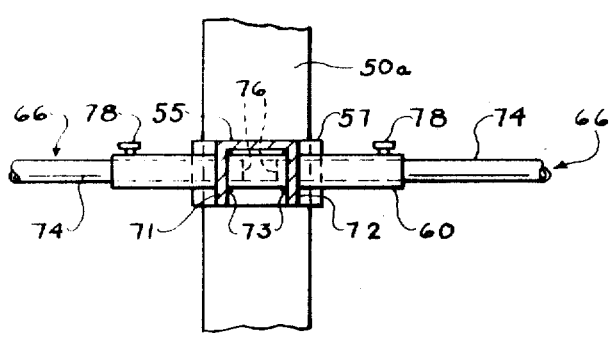
FIG. 11 is an end elevational view, partially in cross-section and taken along the plane of line 11—11 in FIG. 10.

The improved strength and attendant reduction in the weight and cost of materials, as well as the improved manner in which the dividers may be mounted or detached from the connecting channels may best be understood by reference to FIGS. 10 and 11. Channel member 55 is shown mounted to a wooden post 50a with bolt 58 passing through one side of bifurcated flange 57, the post and subsequently the other side of flange 57. It should be noted that flange 57 is preferably formed with openings adjacent the bolt holes in order that nails 61 can be used to temporarily hold the connecting channels in place during construction of the stalls until bolt 58 has been properly positioned. Sockets 60, forming the divider mounting means of this embodiment of the invention, may be provided by a single tubular member which is mounted through mating openings in legs 71 and 72 of channel 55 and secured in place therein by welds 73. As seen in FIG. 5, sockets 60 are preferably aligned in a generally vertical plane to provide vertically spaced and aligned pairs of sockets for receipt of the U-shaped dividers. Dividers 66 are provided with legs 74 which are formed to be inserted to a substantial depth in socket 60. Thus, the ends 76 of legs 74 can be seen to be inserted into sockets 60 a distance equal to several times the diameter of the dividers. In fact, the ends of legs 76 preferably extend beyond the downwardly depending legs 71 and 72 of channel member 55.

In order to control the depth to which the legs of the dividers are inserted into socket 60, it is preferable to form the legs of the dividers with a shoulder or detent means 77 positioned at a predetermined spaced distance from ends 76 of legs 74 of the dividers. Shoulders 77 are formed to engage sockets 60 and thereby limit the distance to which the dividers can be inserted into the sockets. Shoulders 77 can be formed as spot-welds on the outer surface of the divider legs, although the weld does not function to secure leg 74 to socket 60 and preferably it is accomplished at the factory before assembly of the dividers into the sockets.

In order to insure that the dividers are not pulled out of the socket 60, locking means 78 for releasably securing divider legs 74 in the sockets 60 are provided. The locking means may be in the form of a threaded screw 78 which passes through socket 60 and may be screwed down against and frictionally engage leg 74 of the divider.

The advantage of using the tubular socket in combination with inverted U-shaped channels 55 and 56 can be seen by considering the manner in which this form of mounting means resists the normal loading forces encountered in a livestock stall. Since the unitary tubular socket 60 passes through both legs 71 and 72 of the channels, the sockets are secured at relatively spaced apart distances to the channels. From FIG. 11 it will be seen that a downward force on the left leg 74 will cause a moment in the vertical plane about leg 71 of channel 52. This kind of force is induced, for example, by the weight of the dividers or an animal putting a downward force on the dividers. The tubular socket 60 resists this force by a downward force on the upper side of the opening through which socket 60 passes in leg 72 of channel 55. This downward force combines with an upward force at the bottom portion of the opening in leg 71, and the distance between legs 70 and 71 allows a very substantial moment to be supported without creating excessively high bearing forces bearing the tubular sockets and the connecting channels. A similar analysis as to vertical forces on the right leg in FIG. 11 can be made. Referring to FIG. 10 it will be seen that lateral forces on the divider are also resisted by the tubular socket 66. Thus, moments in a horizontal plane by reason of the animal's leaning or bumping against the dividers will be resisted by a couple created between opposite sides of the openings through legs 71 and 72 of channel 55. The change in the divider mounting means from that set forth in FIGS. 1–7 to the socket mounting means of FIGS. 8–11 results in channels 55 and 56 being able to be formed from lighter gauge material than can channels 26. The bolts 32, while effective, do engage a much smaller portion of the channel than do sockets 60. Additionally, plate 30 is eliminated, and the gauge of the dividers can be reduced. The weight of steel per stall can be reduced by almost 50 percent by using the socket mounting means instead of the plate-type mounting means. Both forms of the invention, however, are considerably less complex than prior art livestock stall structures and are also far more versatile.

In manufacturing the livestock stalls of FIGS. 8–11, channel members 55 are fabricated with sockets 60 and end mounting flanges 57 secured thereto. Posts 50 and 51 can be drilled in the factory or in the field for receipt of bolts 58, allowing vertical adjustment for various sized animals. Once channels 55 and 56 are positioned and secured to posts 50 and 51 the pre-formed U-shaped dividers can be inserted in the sockets and locking nuts 78 tightened to form the stalls. As will also be appreciated, locking nuts 78 allow extremely fast removal of dividers 66 from the connecting channels. The nut 78 for each leg of the divider need only be loosened to release the leg. Normally, there are not substantial axial forces on the dividers, and accordingly, the screw 78 can merely be tightened or loosened with a crescent wrench or the like.

The livestock stall divider structures of the present invention can be formed of numerous materials. By way of example channels 26, 55 and 56 can be formed of 10 to 14 gauge carbon steel having a thickness dimension across the body thereof of 6 to 8 inches and a heighth dimension of the legs 71 and 72 of 3 to 5 inches. Dividers 36 and 66 may be formed of steel pipe having a diameter of about 1½ to 2½ inches. Sockets 60 are correspondingly larger pipe for receipt of the dividers. The above dimensions are illustrative of a livestock stall divider sufficient to form eight to 10, 4-foot wide stalls positioned between vertical posts spaced a distance of 12 to 20 feet apart. Since the cows are usually spending a substantial amount of their time lying down, the lower leg of the divide is usually positioned at about 12 to 20 inches above the alleyway curbing with the upper leg of the divider at about 3 feet above the curbing. The depth of the dividers and the stalls is typically about 7 to 8 feet with alleyways of about 10 feet in width.

I claim:
1. In a livestock stall divider structure including, at least two post means disposed in relatively spaced apart relation to define an area therebetween sufficient for a plurality of livestock stalls, connecting means mounted and extending horizontally to span the distance between said post means at a vertically spaced distance above the ground, and a plurality of dividers mounted to said connecting means at a vertically spaced distance above the ground and extending transversely therefrom at horizontally spaced intervals to define livestock stalls therebetween, the improvement comprising:
   said connecting means being formed with at least two vertically spaced apart horizontally extending structural elements of substantial strength;
   a first portion of each of said dividers being secured by divider mounting means to one of said structural elements and a second portion of each of said dividers being secured by said divider mounting means to a second of said structural elements to resist moments in a vertical plane; and
   said divider mounting means further being formed for cantilevered securement of each of said dividers to said structural elements at positions on said structural elements disposed and relatively spaced apart sufficiently to withstand moments about said divider mounting means in a horizontal plane due to repeated lateral deflection of said dividers by livestock.

2. Livestock stall divider structure as defined in claim 1 wherein,
   said dividers are formed as U-shaped members oriented in substantially vertical planes, and
   said divider mounting means includes vertically extending members fixedly secured to both legs of said U-shaped members and formed to extend horizontally away from both sides of the vertical planes in which said dividers are oriented, said divider mounting means further including a plurality of fasteners securing said vertically extending members to both of said channels at horizontally spaced points on both sides of each leg of said U-shaped members to resist moments in a horizontal plane.

3. Livestock stall divider structure as defined in claim 1 wherein,
   said divider mounting means is formed as a plurality of divider receiving sockets secured in horizontally spaced relation along the length of each of said structural elements, said sockets being oriented transverse to the longitudinal axis of said structural elements and being formed for receipt of dividers therein to a substantial depth,
   said dividers are formed for and inserted to a substantial depth in said sockets, and
   said divider mounting means further includes locking means for releasably securing said dividers in said sockets.

4. Livestock stall divider structure as defined in claim 1 wherein,
   said structural elements are provided by at least two vertically spaced apart channel members secured adjacent the ends thereof to said post means, said channel members having a substantial thickness dimension,
   a plurality of divider receiving sockets formed as tubular members fixedly secured to and extending through each of said channel members in horizontally spaced relation along the length of said channel members to provide vertically spaced and aligned pairs of sockets opening to each side of said channel members, and
   said dividers are formed as U-shaped members with the ends of the legs of each of said U-shaped members being formed for and mounted in said vertically spaced and aligned sockets and locked against withdrawal therefrom by said locking means.

5. Livestock stall divider structure as defined in claim 4 wherein,
   said U-shaped members are formed with shoulders positioned at a predetermined spaced distance from the ends of the legs of said U-shaped members, said shoulders being formed to and limiting the distance to which said U-shaped members can be inserted into said tubular members.

6. A livestock stall divider structure as defined in claim 1 wherein,
   said structural elements are provided by relatively vertically spaced apart channel members, said channel members are releasably secured to said post means by fasteners for rapid assembly and disassembly, and said dividers are demountably secured to channel members.

7. In a livestock stall divider structure including, at least two post means disposed in relatively spaced apart relation to define an area therebetween sufficient for a plurality of livestock stalls, connecting means mounted and extending horizontally to span the distance between said post means, and a plurality of dividers mounted to said connecting means at a vertically spaced distance above the ground and extending transversely therefrom at horizontally spaced intervals to define livestock stalls therebetween, the improvement comprising:
   divider mounting means formed as a plurality of divider receiving sockets secured in horizontally spaced relation along the length of said connecting means and being further formed for receipt of said dividers therein to a substantial depth, said sockets being formed to extend through said connecting means to provide a continuous socket facing outwardly on both sides of said connecting means for receipt and mounting of said dividers on both sides of said connecting means, said dividers being mounted in said sockets and extending from at least one side of said connecting means and, said sockets further being formed for cantilevered securement of each of said dividers to said connecting means and being mounted to said connecting means to engage the same at positions on said connectng means disposed and relatively spaced apart along the length of said sockets sufficiently to withstand moments about said divider mounting means in a vertical plane due to the weight of said dividers and moments in a horizontal plane due to repeated lateral deflection of said dividers by livestock.

* * * * *

UNITED STATES PATENT OFFICE
CERTIFICATE OF CORRECTION

Patent No. 3,802,392  Dated April 9, 1974

Inventor(s) Benedict R. Andersen

It is certified that error appears in the above-identified patent and that said Letters Patent are hereby corrected as shown below:

Column 4, line 44, after "dividers" insert --at--.

Column 6, line 35, delete "bearing" (second occurrence) and insert therefor --between--.

Column 7, line 21, change "divide" to --divider--.

Column 7, Claim 2, line 2, delete "1" and insert therefor --6--.

Signed and sealed this 5th day of November 1974.

(SEAL)
Attest:

McCOY M. GIBSON JR.
Attesting Officer

C. MARSHALL DANN
Commissioner of Patents